United States Patent
Plemmons et al.

(10) Patent No.: US 12,516,983 B2
(45) Date of Patent: Jan. 6, 2026

(54) DETECTION SYSTEMS WITH SPATIAL SPECIFICITY AND METHODS OF DETECTING FLAME OR GAS WITH SPATIAL SPECIFICITY

(71) Applicant: CARRIER CORPORATION, Palm Beach Gardens, FL (US)

(72) Inventors: Dayne Plemmons, Minneapolis, MN (US); Nathan Herman, Chanhassen, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/973,338

(22) PCT Filed: Jul. 1, 2020

(86) PCT No.: PCT/US2020/040444
§ 371 (c)(1),
(2) Date: Dec. 8, 2020

(87) PCT Pub. No.: WO2021/003234
PCT Pub. Date: Jan. 7, 2021

(65) Prior Publication Data
US 2022/0187132 A1    Jun. 16, 2022

Related U.S. Application Data

(60) Provisional application No. 62/870,200, filed on Jul. 3, 2019.

(51) Int. Cl.
*G01J 5/00* (2022.01)
*G01J 1/04* (2006.01)
(Continued)

(52) U.S. Cl.
CPC .......... *G01J 5/0018* (2013.01); *G01J 1/0411* (2013.01); *G01J 5/0831* (2013.01); *G01J 5/10* (2013.01)

(58) Field of Classification Search
CPC .............................. G01J 5/0831; G01J 5/0018
See application file for complete search history.

(56) References Cited

U.S. PATENT DOCUMENTS 5,006,710 A * 4/1991 Powell ................... G08B 17/12
250/340
2013/0228692 A1    9/2013 Larsen

OTHER PUBLICATIONS

International Search Report issued in Application No. PCT/US2020/040444 on Oct. 19, 2020, 6 pages.
(Continued)

*Primary Examiner* — Carolyn Fin
(74) *Attorney, Agent, or Firm* — CANTOR COLBURN LLP

(57) ABSTRACT

A detection system includes a photodetector, a spatial light modulator (SLM) device optically coupled to the photodetector, and a controller. The controller is operatively connected to the SLM device and is disposed in communication with the photodetector and a memory. The memory has instructions recorded on the memory that cause the controller to communicate a SLM pattern sequence to the SLM device, modulate illumination incident on the SLM device according to the SLM pattern sequence to generate an illumination pulse sequence, and receive an intensity-time profile from the photodetector corresponding to the SLM pattern sequence. The instructions also cause the controller to signal, with spatial specificity, presence of flame or gas when the intensity-time profile indicates that flame or gas is present within a field of view of the detection system. Detection methods and computer program products are also described.

12 Claims, 4 Drawing Sheets

(51) Int. Cl.
  *G01J 5/0831*  (2022.01)
  *G01J 5/10*  (2006.01)

(56) References Cited

OTHER PUBLICATIONS

Russell Thomas et al., "Compressive hyperspectral sensor for LWIR gas detection", Compressive Sensing, SPIE, vol. 8365, No. 1, May 11, 2012.
Written Opinion issued in Application No. PCT/US2020/040444 on Oct. 19, 2020, 9 pages.
Zhang Jiaqi et al., "Demonstration of a cost-effective single-pixel UV camera for flame chemiluminescence imaging", Applied Optics, Optical Society of America, vol. 58, No. 19, Jul. 1, 2019.

* cited by examiner

DETECTION SYSTEMS WITH SPATIAL SPECIFICITY AND METHODS OF DETECTING FLAME OR GAS WITH SPATIAL SPECIFICITY

CROSS REFERENCE TO RELATED APPLICATIONS

This application claims the benefit of U.S. Application No. 62/870,200, filed on Jul. 3, 2019, which is incorporated herein by reference in its entirety.

BACKGROUND

The subject matter disclosed herein generally related to flame and gas detection, and more particularly to flame or gas detection systems that provide spatial specificity without employing focal-plane arrays.

Focal-plane arrays, such as one-dimensional arrays used in line scanners and two-dimensional arrays in image sensors, are commonly used generate images using electromagnetic radiation incident upon the focal-plane array. The signals provided by such focal-plane arrays can be employed in flame detection and gas detection applications to provide the location of a flame or gas in spaces monitored for the presence of flames or gases, such as using image analysis techniques. For example, in flame detection applications, the signals from focal-plane arrays can provide indication of flame through intensity information reported at wavelengths where flame typically emits electromagnetic radiation. In gas detection applications, the signals from focal-plane arrays can provide indication of the presence of gas by reporting intensity at wavelengths where gases absorb electromagnetic radiation. Since the focal-plane array can be relatively expensive, focal-plane array-based flame or gas detectors can be uneconomical in certain applications.

Such systems and methods have generally been satisfactory for their intended purpose. However, a need remains for improved flame or gas detection systems and methods of detecting flame or gas. The present disclosure provides a solution to this need.

BRIEF SUMMARY

A detection system is provided. The detection system includes a photodetector, a spatial light modulator (SLM) device optically coupled to the photodetector, and a controller. The controller is operatively connected to the SLM device and is disposed in communication with the photodetector and a memory. The memory has instructions recorded on the memory that cause the controller to communicate a SLM pattern sequence to the SLM device, modulate illumination incident on the SLM device according to the SLM pattern sequence to generate an illumination pulse sequence, and receive an intensity-time profile from the photodetector corresponding to the SLM pattern sequence. The instructions also cause the controller to signal, with spatial specificity, presence of flame or gas when the intensity-time profile indicates that flame or gas is present within a field of view of the detection system.

In addition to one or more of the features described above, or as an alternative, further embodiments may include that the photodetector includes one and not more than one photodetector.

In addition to one or more of the features described above, or as an alternative, further embodiments may include that the photodetector includes two or more photodetectors.

In addition to one or more of the features described above, or as an alternative, further embodiments may include that the photodetector includes a photodiode, a photoresistor, a pyroelectric detector, or a thermopile.

In addition to one or more of the features described above, or as an alternative, further embodiments may include that the photodetector does not include a focal-plane array.

In addition to one or more of the features described above, or as an alternative, further embodiments may include wherein the photodetector is an infrared or an ultraviolet photodetector.

In addition to one or more of the features described above, or as an alternative, further embodiments may include wherein the SLM comprises a micro-mirror assembly, a coded aperture, or a liquid-crystal matrix.

In addition to one or more of the features described above, or as an alternative, further embodiments may include an imaging lens optically coupled to the SLM device, and a focusing lens optically coupling the SLM device to the photodetector a focusing lens.

In addition to one or more of the features described above, or as an alternative, further embodiments may include that the instructions cause the controller to provide an indication to a user interface when flame or gas is present within the field of view of the detection system.

In addition to one or more of the features described above, or as an alternative, further embodiments may include that the instructions cause the controller to transpose the intensity-time profile into an intensity-position profile.

In addition to one or more of the features described above, or as an alternative, further embodiments may include that the instructions cause the controller to compare the intensity-position profile to a reference intensity-position profile.

In addition to one or more of the features described above, or as an alternative, further embodiments may include comparing the intensity-position profile to the reference intensity-position profile includes determining whether the intensity-position profile is greater than the reference intensity-position profile by a predetermined value.

In addition to one or more of the features described above, or as an alternative, further embodiments may include comparing the intensity-position profile to the reference intensity-position profile includes determining whether the intensity-position profile is less than the reference intensity-position profile by a predetermined value.

A detection method is also provided. The detection method includes communicating a spatial light modulator (SLM) pattern sequence to a SLM device, modulating illumination incident on the SLM device from a scene according to the SLM pattern sequence to generate an illumination pulse sequence, and receiving, at a controller, an intensity-time profile from a photodetector corresponding to the SLM pattern sequence, wherein a SLM device is optically coupled to the photodetector, wherein the a controller is operatively connected to the SLM device and disposed in communication with the photodetector. Presence of flame or gas when the intensity-time profile indicates that flame or gas is present within the scene with spatial specificity.

In addition to one or more of the features described above, or as an alternative, further embodiments may include transposing the intensity-time profile into an intensity-position profile.

In addition to one or more of the features described above, or as an alternative, further embodiments may include comparing the intensity-position profile to a reference intensity-position profile.

In addition to one or more of the features described above, or as an alternative, further embodiments may include that comparing the intensity-position profile to the reference intensity-position profile includes determining whether the intensity-position profile is greater than the reference intensity-position profile by a predetermined value.

In addition to one or more of the features described above, or as an alternative, further embodiments may include that comparing the intensity-position profile to the reference intensity-position profile includes determining whether the intensity-position profile is less than the reference intensity-position profile by a predetermined value.

In addition to one or more of the features described above, or as an alternative, further embodiments may include that the intensity-time profile is generated using infrared illumination.

A computer-program product is additionally provided. The computer program product is tangibly embodied on a computer readable medium and includes instructions that, when executed by a processor, cause the processor to perform operations including communicating a spatial light modulator (SLM) pattern sequence to a SLM device, modulating illumination incident on the SLM device according to the SLM pattern sequence to generate an illumination pulse sequence, and receiving an intensity-time profile from the photodetector corresponding to the SLM pattern sequence. When presence of flame or gas when the intensity-time profile indicates that flame or gas is present within a field of view of the detection system the instructions cause the processor to signal, with spatial specificity, presence of flame or gas.

Technical effects of embodiments of the present disclosure include the capability for spatial specificity using a relatively simple photodetector. In certain embodiments the spatial specificity allows a single photodetector (or small group photodetectors) to provide area coverage instead of the point coverage, reducing the cost per unit coverage area by eliminating the need for a focal-plane array. In accordance with certain embodiments, an individual photodetector or group of photodetectors with optical bandpass filters can provide sensitivity to electromagnetic radiation with wavelengths characteristic of flame emissions or gas absorptions with dynamic range equivalent to or greater than that of focal-plane arrays.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

In embodiments described herein detection systems allow for flame and gas to be detected within a scene with spatial specificity without employing a focal-plane array. In certain embodiments the detection system includes a spatial light modulator (SLM) device. The SLM device is arranged in the image plane of the device and temporally modulates illumination incident on the SLM device with according to position within the field of view of the detection system. The temporally modulated illumination is communicated to a photodetector, which generates an intensity-time profile using the illumination. The intensity-time profile is transposed into an intensity-position profile, and the intensity profile used to determine whether flame or gas is present within the field of view of the detection system.

As a consequence, infrared emission and absorption signatures can be spatially located in a scene using a single photodetector (or group of discrete photodetectors with different bandpass characteristics). In addition, employment of an individual photodetector can provide a relatively high dynamic-range in comparison to infrared-sensitive focal plane arrays, improving the capability of the detection device to detect flame in a scene. Further, the modulation provided by the SLM device is configurable according to the SLM pattern sequence employed by the SLM device to temporally modulate illumination incident upon the SLM device, allowing the SLM pattern sequence to be customized for the scene within the field of view of the detection system.

Figure 1:
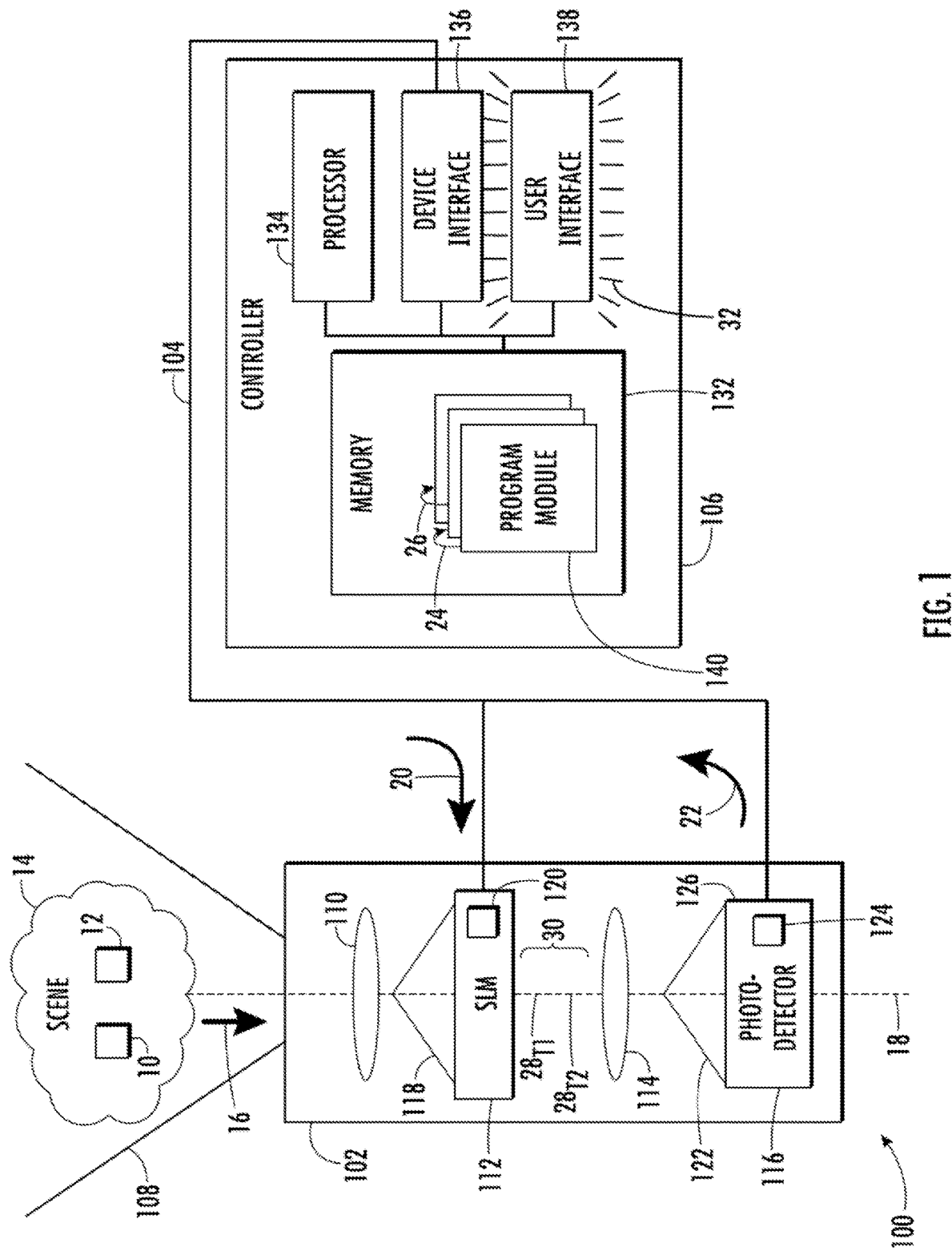
FIG. 1 is block diagram of detection system constructed in accordance with the present disclosure, schematically showing a photodetector optically coupled to a scene by a spatial light modulator (SLM) device for detecting the presence of flame or gas in the scene.

Reference will now be made to the drawings wherein like reference numerals identify similar structural features or aspects of the subject disclosure. For purposes of explanation and illustration, and not limitation, a partial view of an exemplary embodiment of a detection system in accordance with the disclosure is shown in FIG. 1 and is designated generally by reference character 100. Other embodiments of detection systems, detection methods, and computer program products, or aspects thereof, are provided in FIGS. 2-4, as will be described. The systems and methods described herein can be used for detecting flame or gas in a scene of interest with spatial specificity, such as in industrial settings or aircraft hangars, though the present disclosure is not limited to any particular type of structure, flame source, or gas composition in general.

Referring to FIG. 1, the detection system 100 is shown. The detection system 100 is configured for detecting the presence of a flame 10 or a gas 12 in a scene 14 and includes a sensor 102, a link 104, and a controller 106. The sensor 102 has a field of view 108 and is configured to receive illumination 16 from the scene 14 along an optical axis 18. The link 104 connects the sensor 102 to the controller 106 for communication between the sensor 102 and the controller 106, allowing the controller 106 to communicate a SLM pattern sequence 20 to the sensor 102, and the sensor 102 to communicate an intensity-time profile 22 to the controller 106, as will be described. The controller 106 is arranged to transpose the intensity-time profile 22 into an intensity-position profile 24 containing indication of the flame 10 or the gas 12 (when present) in the scene 10 with spatial specificity, i.e. indication of the location of the flame 10 or the gas 12 within the scene 14. The controller 106 is also configured to make a determination 26 as to whether indication of flame gas is present, and if so where, based on the intensity-position profile 24.

The scene 14 contains an area of interest, which the detection system 100 monitors for the presence of the flame 10 or the gas 12. Examples of areas of interest monitored for the presence of flame 10 includes structures, like aircraft hangers. Examples of areas of interest monitored for the presence of the gas 12 include gas handling devices, like valves and pipes or wells. It is to be understood that these exemplary areas of interest are for illustration purposes only, are non-limiting, and that the detection system 100 can also be employed to detect flame or gas in other types of structures and/or gas handling devices.

The sensor 102 includes an imaging lens 110, a SLM device 112, and a focusing lens 114. The sensor 102 also includes a photodetector 116. The imaging lens 110 is optically coupled to the scene 14 along the optical axis 18 by the field of view 108 of the sensor 102. The SLM device 112 is arranged between the imaging lens 110 and the focusing lens 114 along the optical axis 18, and is connected to the controller 106 by the link 104. The focusing lens 114 is arranged between the SLM device 112 and the photodetector 116 along the optical axis 18. The photodetector 116 is arranged along the optical axis 18 and on a side of the focusing lens 114 opposite the SLM device 112, and is also connected to the controller 106 by the link 104.

The imaging lens 110 is configured to collect the illumination 16 received from the scene 14, such as ambient illumination reflected from objects within the scene 14 as well as illumination emitted from within the scene 14, and to further convey the illumination 16 to an image plane 118 defined by the imaging lens 110. It is contemplated that the illumination 16 collected by the imaging lens 110 include information indicative of whether flame or gas is present in the scene 14. For example, the illumination 16 can include electromagnetic radiation having visible wavelengths and/or electromagnetic radiation having infrared wavelengths, e.g., where flame typically emits electromagnetic radiation. It is also contemplated that the illumination 16 can include electromagnetic radiation having ultraviolet wavelengths, as well as electromagnetic radiation from within the near-infrared, shortwave infrared, mid-infrared, and/or near-infrared sub-bands of the electromagnetic spectrum. Such wavelengths can encompass wavelengths where certain gases absorb electromagnetic radiation.

The SLM device 112 is positioned at the image plane 118 and is configured to modulate spatial information illumination 16 received from the scene 10 temporally. More specifically, the SLM device 112 selectively communicates portions of the illumination 16 received from the scene 14 and incident upon the SLM device 112 as discrete pulses 28 of a pulse sequence 30. Each portion in turn is identified by the SLM pattern sequence 20, each of the pulses 28 of the illumination pulse sequence 30 thereby including illumination from a pre determined portion of the field of view 108. For example, a first pulse $28_{T1}$ of the illumination pulse sequence 30 can include illumination from only the left-hand side (relative to the top of FIG. 1) of the field of view 108 while a subsequent pulse $28_{T2}$ of the pulse sequence can include illumination from only the right-hand side (relative to the top of FIG. 1) of the field of view 108.

It is contemplated that the timing of the pulses 28 within the illumination pulse sequence 30, and the positional relationship of respective pulses 28 to regions of the scene 14, be according to the SLM pattern sequence 20. As will be appreciated by those of skill in the art in view of the present disclosure, associating a region of the scene 14 with the timing of a given pulse, and the intensity of the illumination contained therein, modulates the pulses 28 of the illumination pulse sequence 30 with positional information of the illumination according to the timing of the pulses 28 within the illumination pulse sequence 30.

In certain embodiments the SLM device 112 includes a digital micromirror device 120. In accordance with certain embodiments the SLM device 112 can include a coded aperture or a liquid-crystal matrix 112.

The focusing lens 114 is configured to match the pulses 28 of the illumination pulse sequence 30 to the active area of the photodetector 116. More specifically, the focusing lens 114 focuses the pulses 28 of the illumination pulse sequence 30 received from the SLM device 112 at a focal point 122 on a side of focusing lens 114 opposite the SLM device 112. This allows the photodetector 116 to convert intensity within the pulses 28 of the illumination pulse sequence 30 into discrete voltages, which are communicated to the controller 106 as the intensity-time profile 22 for determination of whether flame or gas indicated within the illumination 16 received from the scene 14.

The photodetector 116 is arranged at the focal point 122 and is configured to convert the pulses 28 of the illumination pulse sequence 30 into discrete voltages, which the photodetector 116 communicates to the controller 106. In certain embodiments the photodetector 116 can be a discrete circuit element, thereby being relative simple in comparison to a focal-plane array. For example, in accordance with certain embodiments, the photodetector 116 can include a photodiode 124. It is also contemplated that the photodetector 116 can include a photoresistor, a pyroelectric detector, or a thermopile device 124.

In certain embodiments the photodetector 116 is a single photodetector 116, i.e., includes one and not more than one photodetector. Employing one and not more than one photodetector can limit the cost of the detection system 100, e.g., by employing one discrete photodetector to covert illumination into voltage and without imaging the scene 14. In accordance with certain embodiments the photodetector 116 includes filter 126 having a bandpass corresponding to a waveband (or wavebands) of interest. For example, the filter 126 can have a bandpass including one or more wavelength at which the flame 10 emits electromagnetic radiation. Alternatively, the filter 126 can have a bandpass including one or more wavelength at which the gas 12 absorbs electromagnetic radiation. This can improve the sensitivity of the sensor 102 and/or customize the sensor 102 to a specific flame or gas detection application.

Figure 2:
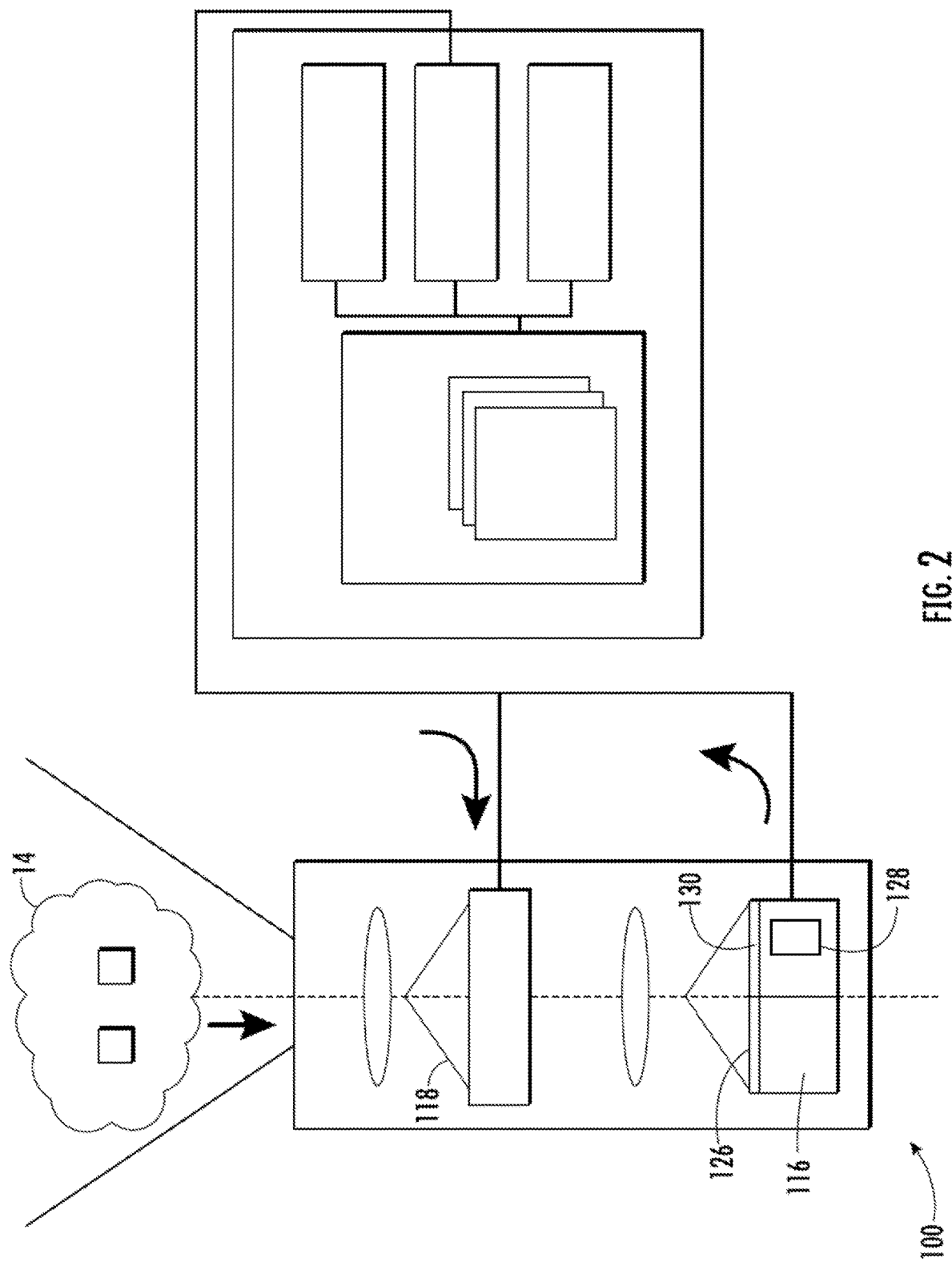
FIG. 2 is block diagram of detection system of FIG. 1 according to another embodiment, showing a sensor having more than one photodetector.

With reference to FIG. 2, the detection system 100 is shown in an implementation having two or more photodetectors. In this respect the photodetector 116 may be a first photodetector 116 and the sensor 102 can include a second photodetector 128. The second photodetector 128 can be similar to the first photodetector 116 and can additionally have a second photodetector filter 130. The second photodetector filter 130 can have a second bandpass including one or more wavelength not within the bandpass of the filter 126, allowing the sensor 102 detect emission (or absorption)

signatures in the illumination within different wavebands. For example, the bandpass of the filter 126 can include one or more wavelength characteristic of a first gas and the bandpass of the second photodetector filter 130 can include one or more wavelength characteristic of a second gas, the sensor 102 thereby being capable of detecting presence of both the first gas and the second gas in the scene 14, or flame emitting electromagnetic radiation having one or more wavelength within the bandpass of both the filter 126 and the second photodetector filter 130.

With continuing reference to FIG. 1, the controller 106 includes a memory 132, a processor 134, and a device interface 136. The controller 106 also includes a user interface 138. The device interface 136 connects the controller 106 to the sensor 102 through the link 104, the controller 106 thereby operatively connected to the sensor 102. More specifically, the device interface 136 connects the controller to the SLM device 112 and the photodetector 116 such that the controller 106 can communicate the SLM pattern sequence 20 to the SLM device 112 and receive the intensity-time profile 22 from the photodetector 116, respectively.

The processor 134 is disposed in communication with the device interface 136, the user interface 138, and the memory 132. Communication with the user interface 138 provides operable connection to the user interface 138, allowing the processor 134 to cause the user interface 138 to provide an indication 32 therethrough the event that flame or gas is detected within the scene 14.

The memory 132 includes a non-transitory machine readable medium have plurality of program modules 140 recorded on the memory 132. The plurality of program modules 140 include instructions that, when read by the processor 134, cause the processor 134 to execute certain operations. Among those operations are the operations of a detection method 200 (shown in FIG. 3). For example, it is contemplated that the instructions can cause the processor 134 to communicate the SLM pattern sequence to the SLM device 112. It is also contemplated that the instructions cause the processor to receive the intensity-time profile 22 from the photodetector 116, transpose the intensity-time profile 22 into the intensity-position profile 24, and determine whether the intensity-position profile 24 indicates the presence of flame or gas within the scene 14. In certain embodiments the SLM pattern sequence 20 is recorded on the memory 132, the SLM pattern sequence 20 thereby being predetermined. In accordance with certain embodiments a reference intensity-position profile 34 (shown in FIG. 4) and/or a predetermined threshold 36 (shown in FIG. 4) can also be recorded within one or more of the program modules 140 on the memory 132 for making the determination 26.

Figure 3:
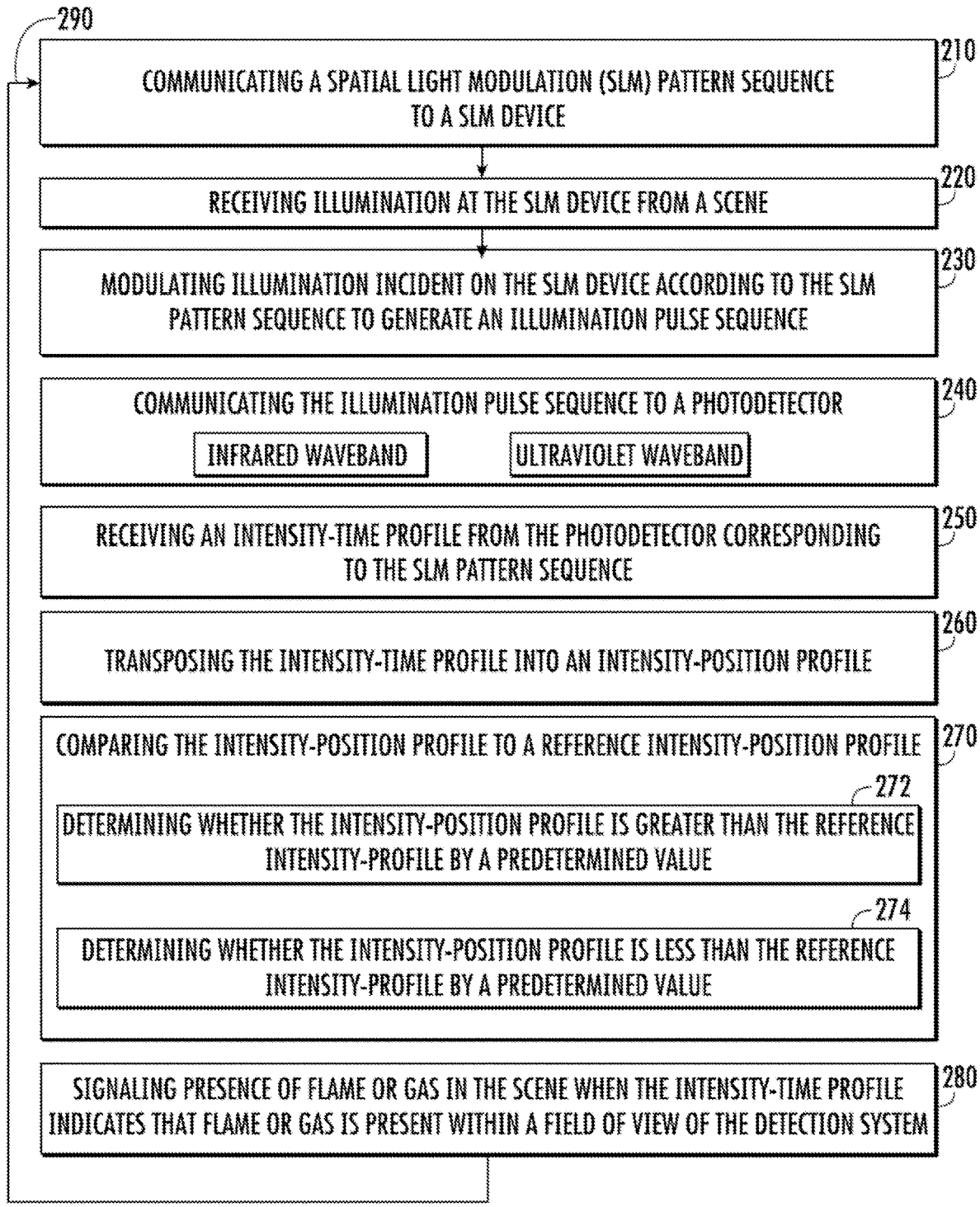
FIG. 3 is a schematic view of the scene and detection system of FIG. 1, showing the detection system signaling the presence of flame in the scene by temporally modulating illumination incident upon the SLM device using a space-time pattern sequence and determining from the modulated illumination a spatial-intensity profile for comparison with a reference flame spatial-intensity profile.

With reference to FIG. 3, the detection method 200 is shown. The detection method 200 includes communicating a SLM pattern sequence to a SLM device, e.g., the SLM pattern sequence 20 (shown in FIG. 1) to the SLM device 112 (shown in FIG. 1), as shown with box 210. As shown with box 220, illumination is received from a scene, e.g., the illumination 16 (shown in FIG. 1) from the scene 14 (shown in FIG. 1), and the illumination incident on of the SLM device modulated according to the SLM pattern to generate an illumination pulse sequence, e.g., the illumination pulse sequence 30 (shown in FIG. 1), as shown with box 230.

As shown with box 240, the illumination pulse sequence is communicated to a photodetector, e.g., the photodetector 116 (shown in FIG. 1). In certain embodiments the illumination communicated to the photodetector is in a waveband where flames emit electromagnetic radiation, e.g., infrared electromagnetic radiation and/or ultraviolet electromagnetic radiation, as shown with box 242 and box 244. In accordance with certain embodiments illumination communicated to the photodetector is in a waveband where a gas absorbs electromagnetic radiation, e.g., infrared electromagnetic radiation and/or ultraviolet electromagnetic radiation, as also shown with box 242 and box 244.

The photodetector converts the illumination pulse train into voltage pulses corresponding to the intensity of the electromagnetic radiation within the pulses received by the photodetector. The voltage pulses are in turn communicated to a controller, e.g., the controller 106 (shown in FIG. 1). The controller receives the voltage pulses as an intensity-time profile corresponding to the SLM pattern, e.g., the intensity time profile 22 (shown in FIG. 1), as shown with box 250, and transposes the intensity-time profile into an intensity-position profile, as shown with box 260.

As shown with box 270, the intensity-position profile is compared to a reference intensity-position profile. In certain embodiments a determination is made as to whether the intensity-position profile is greater than the reference intensity-position profile by a predetermined value, as shown with box 272. In accordance with certain embodiments a determination can be made as to whether the intensity-position profile is less than the reference intensity-profile by a predetermined value, as shown be box 274. As shown with box 280, presence of flame or gas in the scene is signalled when the intensity-time profile indicates that flame or gas is present within the field of view of the detection system. In the event that no flame or gas is indicated in the intensity-time profile monitoring of the scene (and/or the field of view) can continue, as shown with arrow 290.

Figure 4:
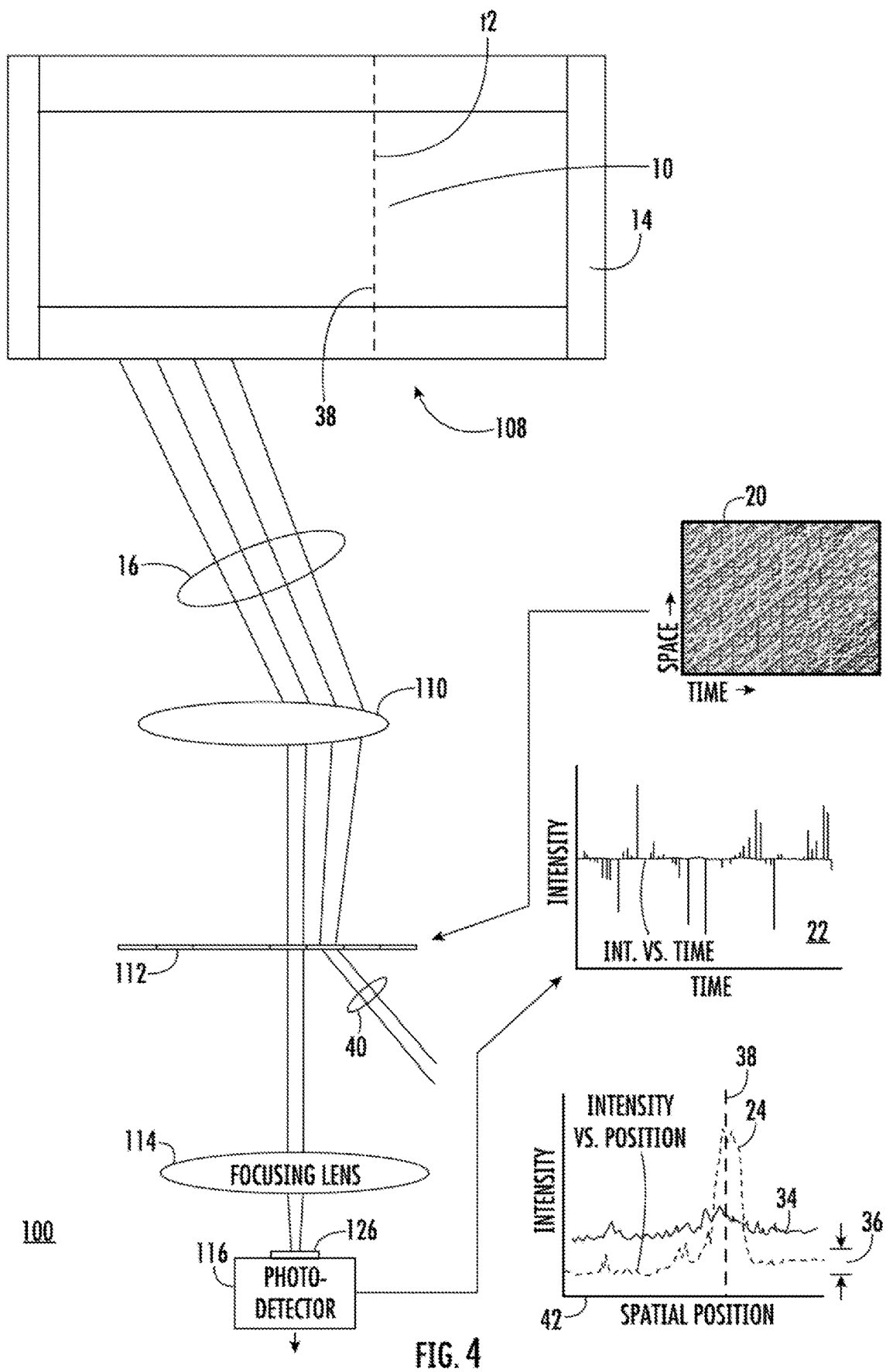
FIG. 4 is a schematic view of the scene and detection system of FIG. 1, showing the detection system signaling the presence of flame in the scene by modulating illumination incident upon the SLM device using a space-time pattern sequence and determining therefrom a spatial-intensity profile.

With reference to FIG. 4, the detection system 100 is shown determining presence of the flame 10 in the scene 14. The flame 10 appears in the scene 10 at a reference line 38. The illumination 16 carrying the spatial information of the flame 10 travels to the imaging lens 110, which collects and collimates the illumination 16 such that the illumination is incident upon a surface of the SLM device 112.

The SLM device 112 selectively transmits the illumination 16 according to the SLM pattern sequence 20, portions the SLM device 112 communicating the illumination 16 to the focusing lens 114 and portions of the SLM device 112 not communicating the illumination 16 to the focusing lens 114 according to time-position associations encoded in the SLM pattern sequence 20. This is indicated at 40, where a portion of the SLM device 112 directs a portion of the illumination 16 off-axis, e.g., through operation of a micromirror, such that the portion of the illumination does not reach the photodetector 116. In other embodiments the portion of the illumination can be absorbed, such as with an aperture array. In either circumstance the remainder of the illumination 16 is communicated by the focusing lens 114 to the photodetector 116.

The photodetector 116 in turn converts illumination incident upon the photodetector 116 into the intensity time profile 22, which the photodetector 116 communicates to the controller 106 (shown in FIG. 1). The controller 106 in turn transposes the intensity-time profile 22 into the intensity-position profile 24. The intensity-position profile 24 is compared to the reference intensity-position profile 34, and presence of flame signalled when the difference between points on intensity-position profile 24 and the reference intensity-position profile 34 at a common position differ from one another by an amount greater than the predetermined threshold 36. When the difference at a position exceeds the predetermined threshold 36, as shown with the reference line 38, the detection system 100 signals presence of the flame 10 in the scene 14, e.g., with the indication 32 (shown in FIG. 1). In certain embodiments the position of the flame, e.g., a location where the reference line 38 intersects the x-axis 42, is included with the indication 32—the detection system 100 thereby indicating position of the flame 10 in the scene 14 with spatial specificity.

As described above, embodiments, such as the plurality of program modules 140 (shown in FIG. 1) recorded on the memory 132 (shown in FIG. 1) can be in the form of processor-implemented processes and devices for practicing those processes, such as generic or an application-specific processor. Embodiments can also be in the form of computer program code containing instructions embodied in tangible media, such as network cloud storage, SD cards, flash drives, floppy diskettes, CD-ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A detection system, comprising:
   a photodetector;
   a spatial light modulator (SLM) device optically coupled to the photodetector; and
   a controller operatively connected to the SLM device and disposed in communication with the photodetector, the controller configured to:
   communicate a SLM pattern sequence to the SLM device;
   modulate illumination incident on the SLM device according to the SLM pattern sequence to generate an illumination pulse sequence;
   receive an intensity-time profile from the photodetector corresponding to the SLM pattern sequence; and
   signal, with spatial specificity, presence of flame or gas when the intensity-time profile indicates that flame or gas is present within a field of view of the detection system;
   wherein signalling the presence of flame or gas includes:
   transposing the intensity-time profile into an intensity-position profile;
   comparing the intensity-position profile to a reference intensity-position profile;
   wherein the presence of flame or gas is signalled in response to the intensity-position profile being greater than the reference intensity-position profile at a common position by an amount greater than a predetermined threshold.

2. The detection system as recited in claim 1, wherein the photodetector comprises one and not more than one photodetector.

3. The detection system as recited in claim 1, wherein the photodetector comprises two or more photodetectors.

4. The detection system as recited in claim 1, wherein the photodetector comprises a photodiode, a photoresistor, a pyroelectric detector, or a thermopile.

5. The detection system as recited in claim 1, wherein the photodetector does not include a focal-plane array.

6. The detection system as recited in claim 1, wherein the photodetector is an infrared or an ultraviolet photodetector.

7. The detection system as recited in claim 1, wherein the SLM devices comprises a micro-mirror assembly, a coded aperture, or a liquid-crystal matrix.

8. The detection system as recited in claim 1, further comprising:
   an imaging lens optically coupled to the SLM device; and
   a focusing lens optically coupling the SLM device to the photodetector.

9. The detection system as recited in claim 1, wherein the controller is configured to provide an indication to a user interface when flame or gas is present within the field of view of the detection system.

10. A detection method, comprising:
    communicating a spatial light modulator (SLM) pattern sequence to a SLM device;
    modulating illumination incident on the SLM device from a scene according to the SLM pattern sequence to generate an illumination pulse sequence;
    receiving, at a controller, an intensity-time profile from a photodetector corresponding to the SLM pattern sequence, wherein a SLM device is optically coupled to the photodetector, wherein the controller is operatively connected to the SLM device and disposed in communication with the photodetector; and signalling, with spatial specificity, presence of flame or gas when the intensity-time profile indicates that flame or gas is present within the scene;

wherein signalling the presence of flame or gas includes:

transposing the intensity-time profile into an intensity-position profile;

comparing the intensity-position profile to a reference intensity-position profile;

wherein the presence of flame or gas is signalled in response to the intensity-position profile being greater than the reference intensity-position profile at a common position by an amount greater than a predetermined threshold.

11. The detection method as recited in claim 10, further wherein the intensity-time profile is generated using infrared illumination.

12. A non-transitory computer readable medium on which a computer program product is tangibly embodied, the computer program product including instructions that, when executed by a processor, cause the processor to perform operations comprising:

communicating a spatial light modulator (SLM) pattern sequence to a SLM device;

modulating illumination incident on the SLM device according to the SLM pattern sequence to generate an illumination pulse sequence;

receiving an intensity-time profile from the photodetector corresponding to the SLM pattern sequence; and signalling, with spatial specificity, presence of flame or gas when the intensity-time profile indicates that flame or gas is present within a field of view of the detection system;

wherein signalling the presence of flame or gas includes:

transposing the intensity-time profile into an intensity-position profile;

comparing the intensity-position profile to a reference intensity-position profile;

wherein the presence of flame or gas is signalled in response to the intensity-position profile being greater than the reference intensity-position profile at a common position by an amount greater than a predetermined threshold.

* * * * *